United States Patent
Ganta et al.

(10) Patent No.: US 10,618,495 B1
(45) Date of Patent: Apr. 14, 2020

(54) FOAM-IN-PLACE PYROTECHNIC SYSTEM

(71) Applicant: Joyson Safety Systems Acquisition LLC, Auburn Hills, MI (US)

(72) Inventors: Sudhakar R. Ganta, Westland, MI (US); Dale E. Tauchen, Clinton Township, MI (US); Deborah L. Hordos, Troy, MI (US); Slaven Domazet, Sterling Heights, MI (US); Sean P. Burns, Almont, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 691 days.

(21) Appl. No.: 14/526,498

(22) Filed: Oct. 28, 2014

Related U.S. Application Data

(60) Provisional application No. 61/896,569, filed on Oct. 28, 2013.

(51) Int. Cl.
*B60R 21/264* (2006.01)
*C06B 21/00* (2006.01)
*C06B 29/00* (2006.01)

(52) U.S. Cl.
CPC ...... *B60R 21/2644* (2013.01); *C06B 21/0025* (2013.01); *C06B 29/00* (2013.01)

(58) Field of Classification Search
CPC ...... B60R 21/2644; C06B 21/25; C06B 29/00
See application file for complete search history.

(56) References Cited

U.S. PATENT DOCUMENTS

| | | | | |
|---|---|---|---|---|
| 3,308,210 A | * | 3/1967 | Ross | F02K 9/36 102/289 |
| 3,646,174 A | * | 2/1972 | Macri | C06B 21/0066 149/22 |
| 4,011,818 A | * | 3/1977 | Stosz, Jr. | C08G 18/69 102/481 |
| 5,053,086 A | * | 10/1991 | Henry | C06B 45/105 149/19.4 |
| 6,789,485 B2 | | 9/2004 | Moquin et al. | |
| 7,993,475 B2 | | 8/2011 | Serizawa et al. | |
| 8,176,851 B2 | | 5/2012 | Kodama et al. | |
| 8,434,411 B2 | | 5/2013 | Daoud et al. | |
| 2003/0233956 A1 | * | 12/2003 | Miskelly, Jr. | C06B 23/007 102/293 |
| 2011/0241324 A1 | * | 10/2011 | Nakayasu | F42B 3/04 280/736 |

FOREIGN PATENT DOCUMENTS

EP          0 941 180          7/2014
WO       WO 2014102365      2/2011

* cited by examiner

*Primary Examiner* — Aileen B Felton
(74) *Attorney, Agent, or Firm* — Meunier Carlin & Curfman LLC

(57) ABSTRACT

A gas generator is provided, the gas generator having a propellant cushion that prevents movement of propellant wafers, tablets, or grains by providing a bias thereagainst. Furthermore, the cushion may be formed from a polyurethane-based foam material and if desired, a known oxidizer combined within the foam. Channels inherent within the polyurethane-based foam enhance the combustion of the main gas generant. Alternatively, the substituted polyurethane polymer combined with an oxidizer may be formed as a monolithic grain that provides autoignition and gas generant function in lieu of a primary gas generant or in lieu of an igniter composition, for example.

23 Claims, 4 Drawing Sheets

FOAM-IN-PLACE PYROTECHNIC SYSTEM

CROSS-REFERENCE TO RELATED APPLICATIONS

The present application claims the benefit of U.S. Application Ser. No. 61/896,569 having a filing date of Oct. 28, 2013.

TECHNICAL FIELD

The present invention relates generally to pyrotechnic gas generators for inflatable restraint devices, and more particularly to such a gas generator having a propellant cushion for biasing a resistance against the main propellant bed to prevent fracture of propellant grains, tablets, and/or wafers therein.

Alternatively, the present compositions may also be formed monolithically to supplant a typical main propellant bed, thereby eliminating the need to press distinct propellant wafers, for example.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators to reduce its size and complexity, while retaining optimal function, has long been a goal of automotive engineers.

Yet another concern is repeatability of performance of the gas generator. Metallic or ceramic cushions may be employed to prevent fracture of the propellant thereby maintaining a relatively constant propellant surface area of combustion. Even though useful in preventing the fracture of propellant, springs or known cushions made from ceramic or metal add to the manufacturing complexity and cost, and to the weight of the overall inflator.

SUMMARY OF THE INVENTION

It is an object of the present invention to provide a gas generator having a propellant cushion that prevents movement of the main propellant wafers or grains by providing a bias thereagainst. Furthermore, the cushion is formed from a polyurethane and a suitable oxidizer as indicated herein.

In accordance with the foregoing and other objects of the invention, a first exemplary passenger-side inflator having a lightweight propellant cushion formed from polyurethane and at least one suitable oxidizer is provided. An exemplary passenger-side inflator (PSI) preferably may include an elongate inflator body having a first and a second end and a plurality of inflation apertures. The inflator (PSI) body defines a first combustion chamber wherein a first propellant charge is positioned. In the exemplary dual-chambered inflator described above, A partitioning assembly is nested within the inflator body, and positioned proximate the second end, the partitioning assembly defining a second combustion chamber wherein a second propellant charge is positioned. The exemplary passenger-side inflator further includes a first and a second initiator, the initiators operably associated with the first and second propellant charges, respectively. The initiators are selectively operable to ignite the propellant charges, thereby supplying an inflation gas via the first chamber to an inflatable restraint cushion.

DETAILED DESCRIPTION OF PREFERRED EMBODIMENTS

Figure 1:
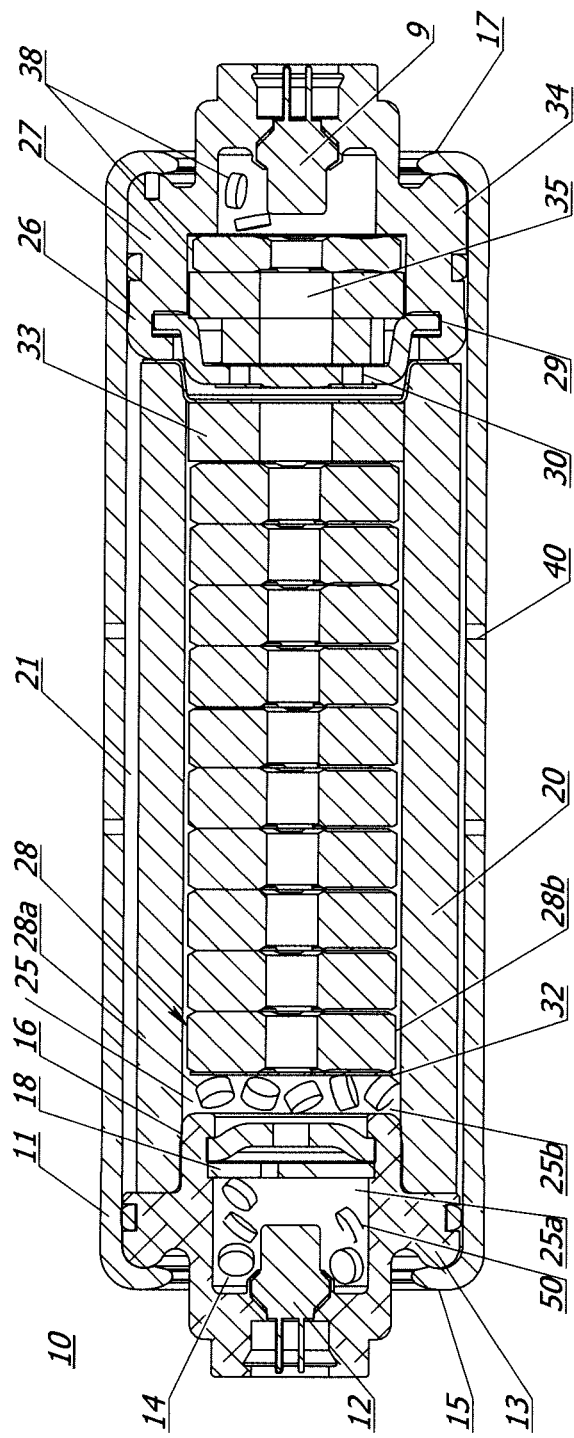
FIG. 1 is a partial side view of an inflator according to a first constructed embodiment of the present invention.

Referring to FIG. 1, there is shown an exemplary passenger side inflator (PSI), or gas generator or inflator 10, according to a first embodiment of the present invention. Inflator 10 is designed for use with an inflatable restraint system in an automobile, supplying inflation gas for inflation of a conventional airbag cushion, a function well known in the art. Inflator 10 utilizes two propellant charges, described herein, that are ignited in separate combustion chambers, and discharge inflation gas via a common plenum 21. Exemplary inflator 10 further provides independently operable initiators for igniting the respective propellant charges, imparting significant variation to the available operating schemes for the inflator. For instance, both sequential and serial firing of the two charges is possible, depending on the optimal deployment of the associated airbag. It is contemplated that inflator 10 will find greatest utility in passenger-side airbag systems; however, other applications are possible without departing from the scope of the present invention. All the components of the present invention are formed from known materials that are readily available commercially.

Inflator 10 includes an elongate pressure vessel or inflator body 11, preferably a hollow steel cylinder. Inflator body 11 is characterized by a first end 15 and a second end 17, and defines a plurality of inflation apertures 40 that allow fluid communication between the exterior of the inflator body and plenum 21. A first end closure 13 is positioned at first end 15 of inflator body 11, preferably creating a fluid seal therewith. A second end closure 34 is preferably positioned at second end 17, also preferably creating a fluid seal with inflator body 11. Closures 13 and 34 are preferably metallic, however, they might be made from another suitable material such as a plastic, a ceramic, or a composite material. First end 15 and second end 17 are preferably crimped inwardly to hold first and second closures 13 and 34 in place, however, some other suitable method such as welding or mating threads on inflator body 11 and the respective closures might be used. In addition, rubber O-rings may be snap-fit around closures 13 and 34, creating or enhancing seals with inflator body 11.

Inflator 10 includes a first combustion chamber 25, within which a quantity of gas generant material or first propellant charge 28 is placed. In a preferred embodiment, chamber 25 comprises a significant proportion of the interior of inflator body 11, defined in part by longitudinal walls of inflator body 11, and in part by first end closure 13. Plenum 21 is the region of inflator body 11 whereby inflation gas is passed to apertures 40. Thus, chamber 25 and plenum 21 are at least partially coextensive. Stated another way, plenum 21 may be loosely defined as an annular portion of chamber 25 that occupies a radially outer part of the middle region of the interior of inflator body 11. The phrase "at least partially coextensive" should be understood to include designs wherein chamber 25 is subdivided by foils, burst shims, etc., as described herein, as well as designs wherein chamber 25 is uninterrupted by such features. First end closure 13 preferably includes a cylindrical extension 16 wherein a perforated disk 18 is positioned, separating chamber 25 into two sub-chambers 25a and 25b. An initiator assembly 12, preferably including a conventional igniter or squib, is positioned at first end 15, and preferably mounted in first end closure 13 such that it can ignite compositions in chamber 25. A second initiator assembly 9, also preferably including a conventional igniter or squib, is positioned at second end 17.

Propellant charge or primary gas generating composition 28 may be any suitable gas generant composition known in the art, preferably a non-azide composition containing phase stabilized ammonium nitrate. Other gas generating compositions or auto-ignition compositions contained within the gas generator may contain perchlorate and chlorate containing oxidizers as known in the art. Exemplary, but not limiting formulations are described in U.S. Pat. Nos. 5,872,329, 5,756,929, 5,035,757, 8,273,199, 7,714,143 (e.g. compositions containing basic copper nitrate and guanidine nitrate), and U.S. Pat. No. 5,386,775, and are herein incorporated by reference in their entireties. In a preferred embodiment, propellant charge 28 is provided in both tablet 28a and wafer 28b forms, both of which are illustrated in FIG. 1. The tablets 28a and wafers 28b may be different compositions, but are preferably the same material in different, commercially available forms. In a preferred embodiment, a retainer disk 32 separates tablets 28a from wafers 28b. Disk 32 may be made from a relatively porous material such that a flame front or heat from ignition of tablets 28a can ignite wafers 28b, or it may be made from a known material that allows ignition of wafers 28b by heat convection from the burning of tablets 28a. A quantity of booster propellant 14 is preferably placed in sub-chamber 25a, and is ignitable via initiator 12 in a conventional manner to ignite and enhance the burn characteristics of the first propellant charge 28a and 28b.

In accordance with one embodiment of the present invention, a cushion 33 is formed from a polyurethane-based propellant foam or composition and is positioned between propellant wafers 28b and a cap 29, thereby inhibiting fracture of the wafers 28b by virtue of its anti-rattle/vibration matrix. It is believed that the microcellular structure of the foam provides combustion channels inherent therein, thereby facilitating the complete combustion or consumption of the main propellant bed upon actuation of the inflator 10. In further accordance of the present invention, the cushion 33 is formed from a composition containing one or more substituted polyurethane polymers. For example, it may be a chemical reaction between hydroxyl-containing molecules (or polyols) and the NCO-group of di-isocyanates resulting in the following polyurethane foams as detailed immediately below in the formula:

Scheme-1

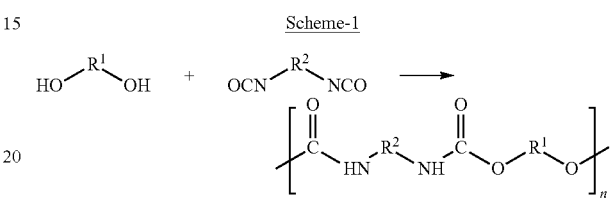

Yet further, the reaction may be more fully expressed as:

Scheme-2

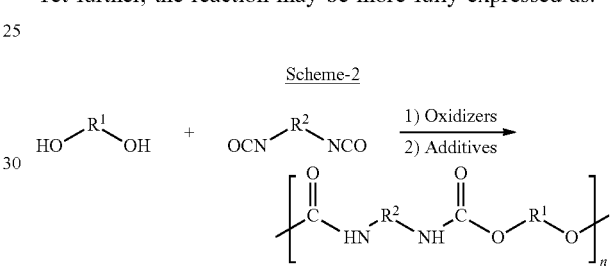

wherein the following explains the groups and reactants:
R1: Aliphatic/aromatic diols, triols, polyols, and aliphatic polyether diols and polyols
R2: Aliphatic/aromatic di-isocyanates (HMDI, MDI, TDI, etc.).
Oxidizers: Metal/non-metal nitrates, chlorates, perchlorates, and oxides.
Additives: Aliphatic/aromatic acids, amines, nitro compounds and their salts; nitrogen-containing heterocycles such as triazoles, tetrazoles, triazines, and their salts; metal hydrides; metal borides; and mixtures thereof.

As indicated in the above reactions, R1 is an aliphatic group that when combined with an —OH or hydroxyl group represents a member from the group of aliphatic diols, triols, and other polyols; aliphatic ether diols and polyols; and monosaccharides and polysaccharides. The aliphatic group may for example be ethyl, propyl, butyl, pentyl, and so forth. Preferably, the resultant polyol contains five or less hydroxyl (—OH) groups. More preferably, the polyol contains two to four hydroxyl functionality. Further, as also indicated, R2 may be an aliphatic such as hexamethylene di-isocyanate (HDI) or an aromatic group selected from methylene diphenyl di-isocyanate, (MDI), Toluene di-isocyanate (TDI), and Isophorone di-isocyanate (IPDI)), that when R2 is reacted with the polyol it thereby forms the polyurethane foam or composition.

One or more substituted polyurethane polymers may be mixed with one or more oxidizers selected from metal perchlorates and nitrates, non-metal perchlorates, basic metal nitrates, transition metal oxides, and mixtures thereof. In particular, an oxidizer may be selected from non-metal, alkali metal, and transition metal perchlorates and nitrates including potassium perchlorate, ammonium perchlorate, basic copper nitrate, and mixtures thereof, for example. Polymeric foam is preferably provided at about 10-90 weight percent of the total weight of the composition of the cushion composition. An oxidizer(s) is preferably provided at about 10-90 weight percent of the total weight of the composition of the cushion composition. If added, a transitional metal oxide is added at about 1.0 to 10.0 weight percent of the total oxidizer component.

If desired, an additive may also be added. For example, an additive may include aliphatic or aromatic compounds selected from carboxylic acids, nitro compounds, nitrate salts, five and six membered heterocycles, tetrazoles and their derivatives, and metal hydrides. The additive may be provided at about 5-25 wt. % of the total pyrotechnic foam. Exemplary additives may include Bis tetrazole, bis tetrazole methane & titanium hydride.

The chemical reactants and constituents of the present invention may be manufactured as described herein, or, may be purchased from companies such as Aldrich, Fisher, and so forth.

The density of the foam may be iteratively determined or modified by altering the weight percent of the polyol and isocyanate fractions of the polyurethane system and/or by altering the weight percent of the oxidizer. It is believed that altering the density of foam is believed to provide an improved burn rate propagation throughout the bed, while yet utilizing the interstitial space defined between the discrete propellant shapes (e.g. wafers, pellets, tablets, asymmetric shapes, and so forth). As a result, a smaller inflator can deliver more gas per unit volume of the inflator or gas generator.

Figure 3A:
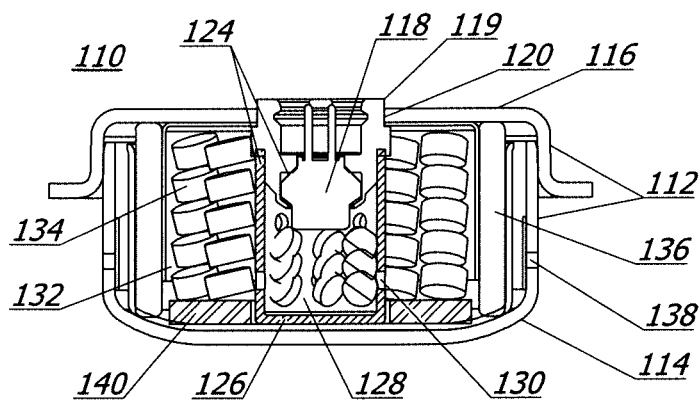
FIG. 3A is a cross-sectional view of an inflator containing a ceramic cushion.
Figure 3B:
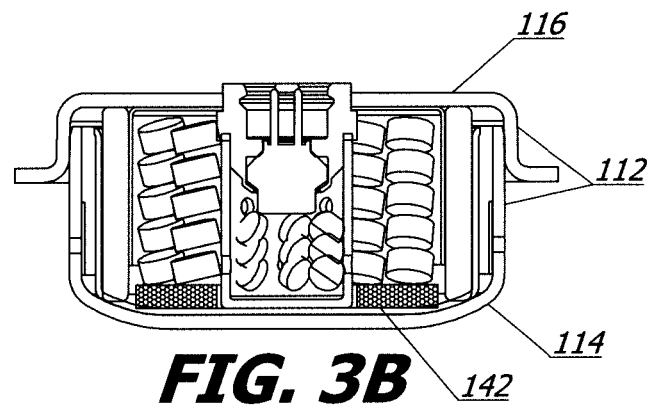
FIG. 3B is a cross-sectional view of an inflator containing a polyurethane/polymeric cushion in accordance with the present invention.
Figure 3C:
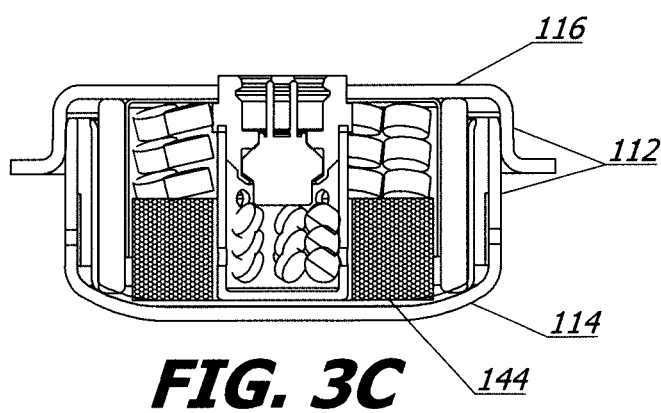
FIG. 3C is a cross-sectional view of an inflator containing a polyurethane/polymeric cushion and gas generant in accordance with the present invention.
Figure 3D:
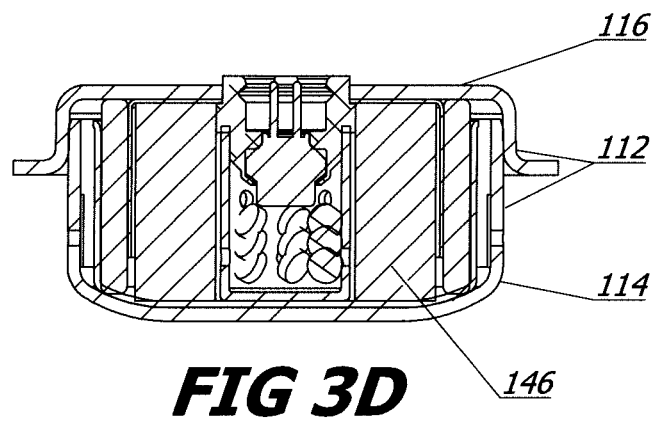
FIG. 3D is a cross-sectional view of an inflator containing a polyurethane/polymeric cushion and gas generant in accordance with the present invention, wherein the gas generant is formed as a monolithic grain within the combustion chamber.

If desired, and as shown in FIGS. 3B-3D, the foam-in-place pyrotechnic system may be used to create a monolithic grain that supplants or at least partially supplants the need for a main gas generant bed. Stated another way, monolithic grains of the present invention may be formed to not only function as an autoignition compound, but also as the main gas generating source. It is believed that maximizing the interface between the inflator housing 114 and the monolithic grain 142, 144, 146 provides an auto-ignition advantage and therefore a safety enhancement, in that the monolithic grain is more efficiently ignited in the event of a bonfire for example.

In one embodiment, pyro foams were made by reacting 2:1 wt. ratios of polyol to di-isocyanate to form polyurethane, and then combined with varying weight ratios of oxidizers and fuels. A polyol is an alcohol containing multiple hydroxyl groups such as exemplary diols (e.g. polyethylene glycol, polypropylene glycol, and poly(tetramethylene ether) glycol), triols (e.g. glycerin), and so forth. Other polyols contemplated include sugar alcohols such as maltitol, sorbitol, xylitol, erythritol, and isomalt.

A process of forming the pyrotechnic or propellant foam is as follows and as illustrated in the above-referenced formula: a 2:1 wt. ratio of polyol to di-isocyanate were added to a 250 ml plastic vial for mixing. Varying wt. ratios of oxidizer or oxidizer/fuel mix, depending upon the formulation, was added to the mixing vial, and then the mix was stirred at room temperature for less than a minute to yield a flexible pyro foam. In most cases the foam cure time is less than a minute. The polyol, isocyanate, and oxidizer are all preferably mixed together for a cure time of about 1 minute. A glass stir rod may be used to mix the material. In larger quantities, a larger, industrial mixer may be used as known in the art. The materials may be mixed on the inflator assembly line and then the resultant foam may be injected into the inflator before it cures, thereby allowing the extruded mixture to cure on the tablet bed and even seep into the void volume or interstitial cavities that are typically defined around the tablets, wafers, or pellets, thereby providing better and more intimate cushioning of the primary propellant bed. Or, the foam may be injected/extruded into the inflator as the only source of main generant, and as such replacing the tablets or wafers. In that embodiment, the foam would fill most if not all of the entire void volume of the combustion chamber. Yet further, as shown in certain examples, the foam may be pre-formed in the shape of a discoid cushion or in the shape of a booster tube, for example, and then inserted into the gas generator as appropriate.

Referring back to the inflator 10 of FIG. 1, partitioning assembly 26 is positioned proximate second end 17, and preferably comprises a substantially cylindrical base member 27 and a cap 29. Base member 27 and cap 29 define a second combustion chamber 35, which at least partially encases a second quantity of propellant 38, preferably in both tablet and wafer form. Base member 27 and second end closure 34 may be the same piece, as in one preferred embodiment, or a plurality of separate, attached pieces might be used. In a preferred embodiment, partitioning assembly 26 is formed structurally independent from inflator body 11. Partitioning assembly 26 is an independent piece having no physical attachment with the longitudinal sidewall of inflator body 11. During assembly of inflator 10, partitioning assembly 26 is slid into position in inflator body 11, and second end 17 is crimped inwardly to secure assembly 26 therein. Thus, other than securing second end closure 34, no modifications are made to inflator body 11 to accommodate or otherwise secure the components defining second combustion chamber 35.

Cap 29 preferably includes a plurality of apertures 30 that can connect second chamber 35 with plenum 21 (as well as first chamber 25, since plenum 21 and chamber 25 are fluidly connected and partially coextensive). In a preferred embodiment, a foil or burst shim (not shown) is placed across apertures 30 to block fluid communications between the two chambers. It should be appreciated, however, that the foil or burst shim is positioned and/or manufactured such that it will not burst inwardly, i.e. in the direction of second end 17 during combustion of propellant in chamber 25. Combustion of propellant in second chamber 35, on the other hand, is capable of bursting the foil or shim outwardly, allowing the combustion products in chamber 35 to escape to plenum 21/first chamber 25, and thereby discharge from inflator body 11. The preferred foils and shims, and the described methods of mounting them are all known in the art. By fluidly isolating first and second chambers 25 and 35, sympathetic ignition of the propellant in chamber 35 during combustion of the propellant in chamber 25 can be avoided, as described herein. The outer diameter of base member 27 is preferably substantially equal to the inner diameter of inflator body 11, such that base member 27 is nested therein, i.e. fits relatively snugly. Because both second end closure 34 and inflator body 11 are preferably substantially cylindrical, the two components are preferably axially aligned. One or more auto-ignition tablets 50 may be placed in inflator 10, allowing ignition of the gas generant materials upon external heating in a manner well known in the art.

In one embodiment of FIG. 1, wafers 28b are positioned in a stack in a primary combustion chamber 25. Again, the cushion 33, is positioned adjacent the stack 28b, and biases the entire stack 28b toward first end 15. Wafers 28b, in turn, preferably bias disk 32 against tablets 28a, preventing tablets 28a from being jostled while the inflator is idle for long periods, helping avoid mechanical degradation of tablets 28a.

The inflator 10 described herein may be altered in design depending on application requirements. Nevertheless, the cushion or propellant restraint 33, in accordance with the present invention is provided in any inflator design, and biased against at least one propellant thereby providing a cushioning effect as formally realized by metallic cushions for example.

In a typical inflatable restraint system design, inflator 10 is connected to an electrical activation system that includes a crash sensor, of which there are many well-known suitable types. In addition, various sensing systems may be incorporated into the vehicle electronics, including seat weight sensors, occupant detection systems, etc. During a typical deployment scenario, an impact or a sudden vehicle deceleration, an activation signal is sent from an onboard vehicle computer to inflator 10. The signal may be sent to either or both of the initiator assemblies housed with inflator 10. Because chamber 25 preferably contains the larger, main charge, the activation signal is typically directed initially to the initiator assembly operably associated with first chamber 25. In certain scenarios, for example with larger occupants, or where occupants are out of a normal seated position in the vehicle, it may be desirable to activate both propellant charges simultaneously. Other scenarios may call for different activation schemes. For instance, certain conditions may make it desirable to fire only the first propellant charge, or sequentially fire both charges, with varying time delays between the two events. Once an electrical activation signal is sent to the initiator associated with first chamber 25, combustion of booster propellant 14 in sub-chamber 25a is initiated. The flame front and/or hot combustion gases from booster 14 subsequently traverse disk 18, initiating combustion of propellant tablets 28a in chamber 25b. The burning of tablets 28a produces inflation gas that flows rapidly out inflation apertures 40, initiating filling of an associated airbag. A cylindrical, metallic mesh filter 20 is preferably positioned in inflator body 11 and as shown in the current embodiment in plenum 21, whereby filter 20 filters slag produced by the combustion of the compounds therein, and also serves as a heat sink to reduce the temperature of the inflation gas. Combustion of tablets 28a initiates combustion of wafers 28b, preferably made from the same or similar material as tablets 28a, providing a sustained burn that delivers a relatively constant supply of gas to the associated airbag via plenum 21 and apertures 40. When desired, an electrical activation signal is sent to the initiator operably associated with second chamber 35, containing a gas generant composition 38 that is preferably similar to the composition in chamber 25. Rapid creation of gas in chamber 35 causes a rapid rise in the gas pressure therein, outwardly bursting the foil or shim (not shown) that covers apertures 30, in cap 29. The gas is subsequently discharged from inflator 10 via plenum 21 and apertures 40. Activation of the gas generant in chamber 35 can take place before, during, or after an activation signal is sent to initiator assembly 12, operably associated with chamber 25.

Because both chambers 25 and 35 discharge inflation gas through plenum 21, the present invention provides different operating advantages over many earlier designs wherein separate plenums are used for each combustion chamber. By discharging inflation gases from both combustion chambers 25 and 35 through plenum 21, the inflation profile characteristics across the length and width of an associated airbag can be improved as compared to earlier multi-chamber designs wherein the combustion chambers discharge via separate plenums. In addition, the use of a partitioning assembly structurally independent from the inflator body sidewalls allows the inflator to be constructed without crimping or otherwise modifying the inflator body itself. Moreover, because inflator 10 utilizes a plenum that is coextensive with a first of the combustion chambers, inflator 10 has a simpler design than multi-chamber inflators utilizing combustion chambers that are both partitioned from a common plenum. Inflator body 11 utilizes no attached internal partitions, and can therefore be manufactured without the need for strengthening to compensate for weakening caused by partition attachment. These and other advantages reduce the cost, manufacturing complexity, size and weight of the inflator.

Figure 2:
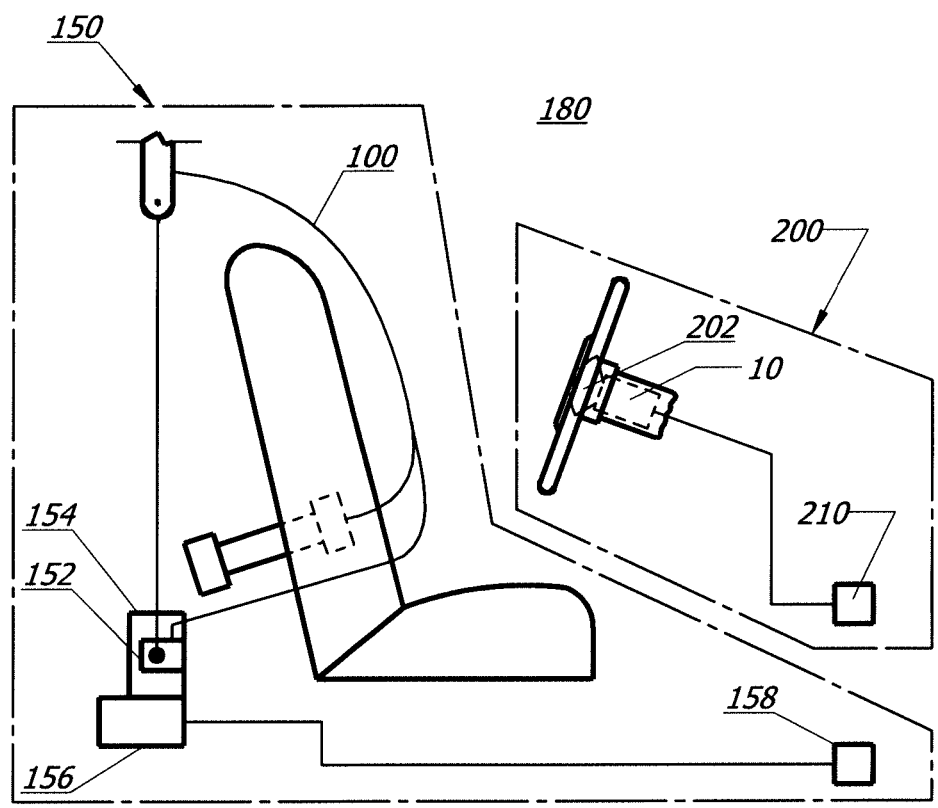
FIG. 2 is a schematic view of an exemplary gas generating system, a vehicle occupant protection system, in accordance with the present invention.

Referring now to FIG. 2, the exemplary inflator 10 described above may also be incorporated into an airbag system 200. Airbag system 200 includes at least one airbag 202 and an inflator 10 containing a pyrotechnic or propellant foam composition 33, 142, 144, 146, 148, and/or 150 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667, 161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit vehicle occupant protection systems contemplated in accordance with the present invention.

In yet another embodiment of the present invention shown in FIGS. 3A-3F, the polyurethane polymer and oxidizer blend may be provided in the same manner within a driver side inflator (DSI). As shown in FIGS. 3A-3F, the DSI 110 contains a housing 112. A perforated base 114 and a cap 116 are nested and joined together to form the housing 112. An igniter 118 is sealed within a complementary igniter orifice 120 within the cap 116, in a known way. For example, the igniter 118 may be provided in a body bore seal assembly 119 as known in the art. At least one igniter assembly 124 containing the igniter 118 and a perforated igniter tube 126 may be provided centrally within the housing 112, in a known manner. For example, the igniter tube 126 may be press fit to the body bore seal assembly 119 and to the base 114, whereby an ignition chamber 128 is thereby provided within the igniter tube 126. Igniter chamber orifices 130 provide fluid communication from the igniter tube chamber 128 to a combustion chamber 132, and may or may not be sealed with burst shims, tape seals, or other seals as known in the art.

As shown in the drawings, the combustion chamber 132 is formed within the housing 112 for combustion of an associated gas generating composition 134.

An annular filter 136 is provided within the combustion chamber 132, and is made in a known manner, from metallic mesh for example. Upon combustion of the gas generant 134 (formed in a known manner as described above), the effluent is filtered as it passes through the filter 136.

As shown in a known configuration of FIG. 3A, a ceramic cushion 140 may be used as a typical cushion for protecting the integrity of the gas generating composition tablets 134.

As shown in FIG. 3B, and in accordance with the present invention, the ceramic cushion 140 of FIG. 3A may be replaced with a polyurethane/polymeric cushion 142, whereby the cushion 142 is injected into the inflator 110 and then cured therein, as described above in the Example, for instance.

As shown in FIG. 3C, and in accordance with the present invention, the ceramic cushion 140 of FIG. 3A and a portion of the gas generating composition 134 may be replaced by a polyurethane/polymeric charge 144, whereby the cushioning function and a portion of the gas generating function is provided by the charge 144. Again, the charge 144 may be injected into the inflator or gas generator 110 and then cured therein, as described above in the Example, for instance.

As shown in FIG. 3D, and in accordance with the present invention, the ceramic cushion 140 of FIG. 3A and all of the known gas generating composition 134 may be replaced with a polyurethane/polymeric monolithic charge 146, whereby the cushioning function and substantially all of the gas generating function are provided by the monolithic charge 146. Again, the monolithic charge 146 may be injected into the inflator or gas generator 110 and then cured therein, as described above in the Example, for instance.

Figure 3E:
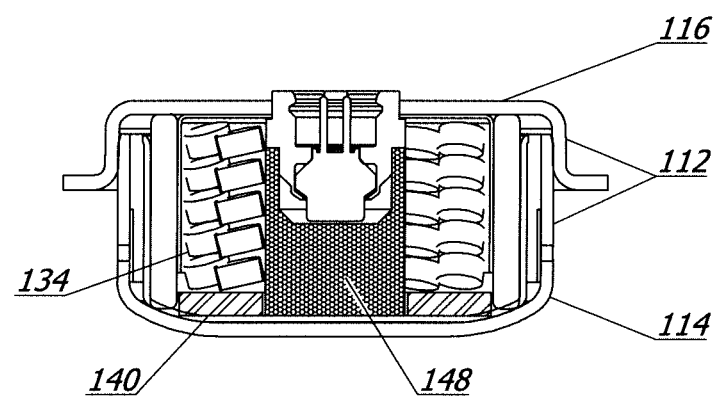
FIG. 3E is a cross-sectional view of an inflator containing a ceramic cushion and known gas generant, and an igniter composition formed as a monolithic grain within the igniter chamber, in accordance with the present invention.

As shown in FIG. 3E, and in accordance with the present invention, the ceramic cushion 140 and the known primary gas generating composition 134 may be retained while still utilizing the advantages of the present invention. As shown in FIG. 3A, a known ignition composition, such as that described in U.S. Pat. No. 5,035,757 for example only, may be provided in a known manner. In the embodiment of FIG. 3E, however, the ignition composition is completely replaced by a monolithic charge 148. Again, the monolithic ignition charge 148 may be injected into the inflator or gas generator 110 during the manufacturing process, and then cured within the inflator 110, as described above in the Example, for instance.

Gas exit orifices 138 are formed in the housing 112 or base 114, and may or may not be sealed with burst shims, tape seals, or other seals as known in the art.

Figure 3F:
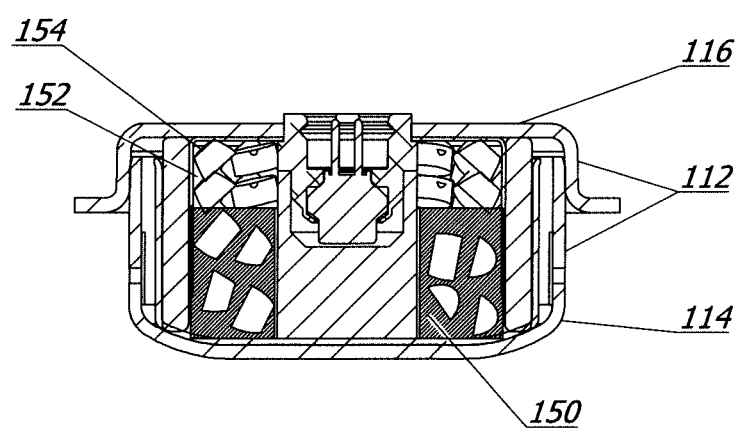
FIG. 3F is a cross-sectional view of an inflator containing a primary gas generating composition at least partially encapsulated by a secondary gas generating composition/cushion injected amongst the tablets constituting the primary gas generating composition.

As shown in FIG. 3F, and in accordance with the present invention, the pyro foam 150 occupies at least a portion of the interstitial cavities 152 that are defined between the propellant shapes 154. As described above, the pyro foam 150 may be mixed in an uncured state, including an oxidizer, and then injected or extruded into the cavities prior to the pyro foam setting or curing in place. As the pyro foam 150 is injected it migrates into the open areas or interstitial cavities 152 defined between the propellant shapes 154, thereby providing a more intimate cushioning between at least some of the propellant tablets or shapes 154. Additionally, as can be seen in FIG. 3F, the ability to maximize the efficient use of space within the combustion chamber facilitates the ability to produce more gas with a relatively smaller amount of volume, presenting a more efficient "mols of gas per unit volume".

Example 1

As described just above and as exemplified in the reaction, a mixture containing a 2:1 (weight) wt. ratio of polyol (nominal hydroxyl functionality of from 2 to 4) to di-isocyanate (Methylene diphenyl di-isocyanate) was added to a combustion chamber to form a mixture. Next, oxidizer component(s) at twice the weight of the mixture of the polyol and the di-isocyanate were added to a combustion chamber (effectively a mixing chamber) and the mix was then stirred, using a glass rod, for less than a minute to yield a monolithic pyrotechnic or propellant foam of the desired shape and size. The total weight percent of the polyol combined with di-isocyanate is 10-90 weight percent, and the total weight percent of the oxidizer ingredients is 10-90 weight percent.

Example 2

As described just above and as exemplified in the reaction, a mixture containing a 2:1 (weight) wt. ratio of polyol (nominal hydroxyl functionality of from 2 to 4) to di-isocyanate (Methylene diphenyl di-isocyanate) was added to an injector or extruding tool. Next, an oxidizer component(s) at twice the weight of the mixture of the polyol and the di-isocyanate was added to the injector or extruding tool (effectively a mixing chamber) and the mix was stirred or agitated. The mixture was retained briefly in the injector in an uncured state and then injected into an inflator as shown in FIG. 3F, and more specifically into a propellant bed having interstitial cavities defined between the discrete primary propellant shapes, tablets, or wafers. The uncured mixture permeated at least a portion of the propellant bed and migrated into at least a portion of the interstitial cavities thereby providing localized cushioning areas within the propellant bed. When cured, the injected mixture formed a secondary propellant along with providing the cushioning benefit. Upon combustion of the first and second propellants within the inflator, a greater amount of gas was produced as compared to combustion of a propellant bed containing only the primary propellant.

Example 3 (PUR-27)

A tabletted primary composition was prepared as in U.S. Pat. No. 8,273,199, the teachings of which are herein incorporated by reference. A pyrotechnic or propellant foam (secondary composition) was prepared as in Example 1, wherein the polyol was provided at 10 grams, twice the amount of di-isocyanate provided at 5 grams. The uncured pyrotechnic foam was then mixed and injected into at least a portion of the interstitial cavities of 10 grams of the aforementioned tablets. The tablets generally settled into the bottom and middle regions of the injected foam. Upon curing, the pyrotechnic foam exhibited a flexible nature. The combined primary and secondary compositions exhibited an auto-ignition temperature of about 210-220 C as measured by hot plate.

Example 4 (PUR-28)

A powdered primary composition was prepared as in U.S. Pat. No. 8,273,199 and as in Example 3 (except that it is powdered), the teachings of which are herein incorporated by reference. A pyrotechnic or propellant foam (secondary composition) was prepared as in Example 1, wherein the polyol was provided at 10 grams, twice the amount of di-isocyanate provided at 5 grams. The uncured pyrotechnic foam was then mixed with 15 grams of the aforementioned powdered primary composition and then injected into an inflator such as the inflator of FIG. 3C-3E. The powdered primary composition contributed to a pyrotechnic foam that was formed as more of a monolithic grain type. The combined primary and secondary compositions did not exhibit auto-ignition behavior at or below 250 C.

Example 5 (PUR-29)

A powdered primary composition was prepared as in Example 4 and U.S. Pat. No. 8,273,199, the teachings of which are herein incorporated by reference. A pyrotechnic foam (secondary composition) was prepared as in Example 1, wherein the polyol was provided at 10 grams, twice the amount of di-isocyanate provided at 5 grams. The uncured pyrotechnic or propellant foam was then mixed with 15 grams of the aforementioned powdered primary composition and 30 g of potassium perchlorate, and then injected into an inflator such as the inflator of FIG. 3C-3E. The powdered primary composition and the pyrotechnic foam was hard and stiff, and formed as more of a monolithic grain type. The combined primary and secondary compositions did not exhibit auto-ignition behavior at or below 250 C.

Example 6 (PUR-30)

A powdered primary composition was prepared as in Example 4 and U.S. Pat. No. 8,273,199, the teachings of which are herein incorporated by reference. A pyrotechnic or propellant foam (secondary composition) was prepared as in Example 1, wherein the polyol was provided at 10 grams, twice the amount of di-isocyanate provided at 5 grams. The uncured pyrotechnic foam was then mixed with 3 grams of the aforementioned powdered primary composition, and then injected into an inflator such as the inflator of FIG. 3C-3E. The powdered primary composition and the pyrotechnic foam formed as more of a monolithic grain type. The combined primary and secondary compositions did not exhibit auto-ignition behavior at or below 250 C.

Example 7 (PUR-31)

A powdered primary composition was prepared as in Example 4 and U.S. Pat. No. 8,273,199, the teachings of which are herein incorporated by reference. A pyrotechnic foam (secondary composition) was prepared as in Example 1, wherein the polyol was provided at 10 grams, twice the amount of di-isocyanate provided at 5 grams. The uncured pyrotechnic foam was then mixed with 5 grams of the aforementioned powdered primary composition, and then injected into an inflator such as the inflator of FIG. 3C-3E. The powdered primary composition and the pyrotechnic foam formed as more of a monolithic grain type. The combined primary and secondary compositions did not exhibit auto-ignition behavior at or below 250 C.

Example 8 (PUR-32)

A powdered primary composition was prepared as in Example 4 and U.S. Pat. No. 8,273,199, the teachings of which are herein incorporated by reference. A pyrotechnic foam (secondary composition) was prepared as in Example 1, wherein the polyol was provided at 10 grams, twice the amount of di-isocyanate provided at 5 grams. The uncured pyrotechnic or propellant foam was then mixed with 7.5 grams of the aforementioned powdered primary composition, and then injected into an inflator such as the inflator of FIG. 3C-3E. The powdered primary composition and the pyrotechnic foam was formed as more of a monolithic grain type. The combined primary and secondary compositions did not exhibit auto-ignition behavior at or below 250 C.

Example 9 (PUR-33)

A powdered primary composition was prepared as in Example 4 and U.S. Pat. No. 8,273,199, the teachings of which are herein incorporated by reference. A pyrotechnic or propellant foam (secondary composition) was prepared as in Example 1, wherein the polyol was provided at 10 grams, twice the amount of di-isocyanate provided at 5 grams. The uncured pyrotechnic foam was then mixed with 15 grams of the aforementioned powdered primary composition, and then injected into an inflator such as the inflator of FIG. 3C-3E. The powdered primary composition and the pyrotechnic foam formed as more of a monolithic grain type. The combined primary and secondary compositions did not exhibit auto-ignition behavior at or below 250 C.

Example 10 (PUR-34)

A tabletted primary composition was prepared as in Example 3 and U.S. Pat. No. 8,273,199, the teachings of which are herein incorporated by reference.

The tablets were then added to a combustion chamber as shown in FIG. 3F, at about 30 grams. A pyrotechnic or propellant foam (secondary composition) was prepared as in Example 1, wherein the polyol was provided at 10 grams, twice the amount of di-isocyanate provided at 5 grams. The mixture was retained briefly in the injector in an uncured state and then injected into an inflator as shown in FIG. 3F, and more specifically into a propellant bed having interstitial cavities defined between the discrete primary propellant shapes or tablets. The uncured mixture permeated the propellant bed and migrated into at least a portion of the interstitial cavities thereby providing localized cushioning areas within the propellant bed. In essence, the tablets were well-embedded in the foam. When cured, the injected mixture formed a secondary propellant along with providing the cushioning benefit. Upon combustion of the first and second propellants within the inflator, a greater amount of gas was produced as compared to combustion of a propellant bed containing only the primary propellant. The combined primary and secondary compositions exhibited an auto-ignition temperature of about 210-220 C as measured by hot plate.

Example 11 (PUR-35)

A tabletted primary composition was prepared as in Example 3 and U.S. Pat. No. 8,273,199, the teachings of which are herein incorporated by reference.

The tablets were then added to a combustion chamber as shown in FIG. 3F, at about 45 grams. A pyrotechnic or propellant foam (secondary composition) was prepared as in Example 1, wherein the polyol was provided at 10 grams, twice the amount of di-isocyanate provided at 5 grams. The mixture was retained briefly in the injector in an uncured state and then injected into an inflator as shown in FIG. 3F, and more specifically into a propellant bed having interstitial cavities defined between the discrete primary propellant shapes or tablets. The uncured mixture permeated the propellant bed and migrated into at least a portion of the interstitial cavities thereby providing localized cushioning areas within the propellant bed. In essence, the tablets were well-embedded in the foam. When cured, the injected mixture formed a secondary propellant along with providing the cushioning benefit. Upon combustion of the first and second propellants within the inflator, a greater amount of gas was produced as compared to combustion of a propellant bed containing only the primary propellant. The combined primary and secondary compositions exhibited an auto-ignition temperature of about 210-220 C as measured by hot plate.

Example 12 (PUR-40)

A powdered primary composition containing guanidine nitrate, strontium nitrate, ammonium perchlorate, and maleic hydrazide was prepared as described in U.S. Pat. No. 8,783,188, herein incorporated by reference in its entirety.

The powdered primary gas generating composition was then added to a combustion chamber as shown in FIG. 3F, at about 12 grams. A pyrotechnic or propellant foam (secondary composition) was prepared as in Example 1, wherein the polyol was provided at 8 grams, twice the amount of di-isocyanate provided at 4 grams. The primary gas generating composition was added to the secondary composition and stirred. The resultant mixture was retained briefly in the injector in an uncured state and then injected into an inflator as shown in FIG. 3C-3E as a monolithic grain. When cured, the injected mixture formed a monolithic grain. Upon combustion of the first and second propellants within the inflator, a greater amount of gas was produced as compared to combustion of a propellant bed containing only the primary propellant. The combined primary and secondary compositions auto-ignited at temperatures equal to or less than 250 C, as measured by hot plate.

Example 13 (PUR-BASELINE) Heat Aging

A pyrotechnic or propellant foam was prepared as in Example 1, wherein the polyol was provided at 10 grams, twice the amount of di-isocyanate provided at 5 grams. The resultant foam was heat aged at 107 C for 17 days. The foam or composition lost 0.5314% by weight. The foam was slightly discolored to a brownish color. When initiating combustion within an exemplary inflator of FIG. 3B-3F, the combustion behavior is similar for both baseline and certain aged materials—gases are melted off and then the composition combusts. The microstructure of this compound, as provided by a scanning electron microscope (SEMS), exhibits open and closed cells, and well-interconnected micro pores. In contrast, the density of this polyurethane compound is less than other elastomers such as silicone and therefore, on a comparative basis, the pyrotechnic foam compositions of the present invention unexpectedly provide enhanced and superior combustion propagation as compared to other elastomers such as silicone when similarly employed such as in FIGS. 3B-3F. See the Examples described herein relative to support for those unexpected and superior results correlating the pyrotechnic or propellant foams of the present invention.

Example 14 (PUR-4) Heat Aging

A pyrotechnic or propellant foam was prepared as in Example 1, wherein the polyol was provided at 10 grams, twice the amount of di-isocyanate provided at 5 grams. Potassium nitrate, at about 30 grams, was mixed into the uncured polyol/di-isocyanate mixture (polyurethane) prior to curing, wherein the polyurethane to potassium nitrate mixture was about 1:2 by weight ratio. The resultant foam was heat aged at 107 C for 17 days. The foam or composition lost 0.4113% by weight. The foam was off-white in color. When initiating combustion within an exemplary inflator of FIG. 3C-3E, the combustion behavior is similar for both baseline and certain aged materials—gases are melted off and then the composition combusts.

Example 15 (PUR-5) Heat Aging

A pyrotechnic or propellant foam was prepared as in Example 1, wherein the polyol was provided at 10 grams, twice the amount of di-isocyanate provided at 5 grams. Potassium perchlorate, at about 15 grams, was mixed into the uncured polyol/di-isocyanate mixture (polyurethane) prior to curing, wherein the polyurethane to potassium perchlorate mixture was about 1:1 by weight ratio. The resultant foam was heat aged at 107 C for 17 days. The foam or composition lost 0.4025% by weight. The foam was light brown in color.

Example 16 (PUR-10) Heat Aging

A pyrotechnic or propellant foam was prepared as in Example 1, wherein the polyol was provided at 10 grams, twice the amount of di-isocyanate provided at 5 grams. Potassium perchlorate, at about 45 grams, was mixed into the uncured polyol/di-isocyanate mixture (polyurethane) prior to curing, wherein the polyurethane to potassium perchlorate mixture was about 1:3 by weight ratio. The resultant foam was heat aged at 107 C for 17 days. The foam or composition lost 0.2883% by weight. The foam was off-white in color. The microstructure of the present pyrotechnic foam/composition (and Example 15), as provided by a scanning electron microscope (SEMS), indicates a microcellular microstructure with a relatively greater intimately mixed oxidizer (potassium perchlorate), as compared to other known compositions defined in Example 24 for instance, that facilitates a gas generating composition or propellant with improved burning properties such as a burn rate greater than 0.25 inches per second at 1-10 psi.

Example 17 (PUR-8) Heat Aging

A pyrotechnic or propellant foam was prepared as in Example 1, wherein the polyol was provided at 10 grams, twice the amount of di-isocyanate provided at 5 grams. Basic copper nitrate, at about 15 grams, was mixed into the uncured polyol/di-isocyanate mixture (polyurethane) prior to curing, wherein the polyurethane to basic copper nitrate mixture was about 1:1 by weight ratio. The resultant foam was heat aged at 107 C for 17 days. The foam or composition lost 2.04% by weight. The foam was blue to dark green in color. The composition did not pass heat aging tests.

Example 18 (PUR-13) Heat Aging

A pyrotechnic or propellant foam was prepared as in Example 1, wherein the polyol was provided at 10 grams, twice the amount of di-isocyanate provided at 5 grams. Potassium perchlorate at about 15 grams, and copper oxide at about 30 grams was mixed into the uncured polyol/di-isocyanate mixture (polyurethane) prior to curing, wherein the polyurethane to potassium perchlorate to copper oxide mixture was about 1:1:2 by weight ratio. The resultant foam was heat aged at 107 C for 17 days. The foam or composition lost 0.3213% by weight. The foam was black in color. When initiating combustion within an exemplary inflator of FIG. 3C-3E, this composition combusted well and sustained the combustion. The microstructure of the present pyrotechnic foam/composition, as provided by a scanning electron microscope (SEMS), indicates a microcellular microstructure with a relatively greater interconnected microcellular structure, resulting in a relatively higher thermal conductivity as compared to other gas generating compositions, as compared to other compositions defined in Example 24 for instance, that results in a relatively lower temperature burning propellant thereby reducing the need to cool the gas combustion products to the same extent as other known gas generating compositions.

Example 19 (PUR-60) Heat Aging

A pyrotechnic or propellant foam was prepared as in Example 1, wherein the polyol was provided at 10 grams, twice the amount of di-isocyanate provided at 5 grams. Potassium perchlorate at about 30 grams, and titanium hydride at about 15 grams was mixed into the uncured polyol/di-isocyanate mixture (polyurethane) prior to curing, wherein the polyurethane to potassium perchlorate to titanium hydride mixture was about 1:2:1 by weight ratio. The resultant foam was heat aged at 107 C for 17 days. The foam or composition lost 0.03057% by weight. The foam was gray in color. This composition exhibited the best resistance to heat aging. When initiating combustion within an exemplary inflator of FIG. 3C-3E, this composition combusted well and sustained the combustion.

The examples directed at heat aging were found to be satisfactory with less than 1.0% by weight of mass loss.

Example 20—Pyrofoam Propellant Properties (PUR-KP:11)

A pyrotechnic or propellant foam was substantially prepared as described in Examples 15 and 16. However, in this example, the weight ratio of polyurethane to potassium perchlorate was 1:1. The oxygen balance was −71. Upon combustion in an inflator exemplified in FIGS. 3C-3E, the gas yield was 4.87 mol/100 g. The gas conversion was about 73 weight percent of the combustion products. The solids produced upon combustion were about 23 weight percent, the weight percents taken with regard to the total weight of the combustion products. In this composition, the mols of nitrogen were 7.6, the mols of carbon dioxide were 13, and the mols of water were 72.

The gas molecular weight in grams per mol was 38.

Example 21—Pyrofoam Propellant Properties (PUR-KP:12)

A pyrotechnic or propellant foam was substantially prepared as described in Examples 15 and 16. However, in this example, the weight ratio of polyurethane to potassium perchlorate was 1:2. The oxygen balance was −33.7. Upon combustion in an inflator exemplified in FIGS. 3C-3E, the gas yield was 3.77 mol/100 g. The gas conversion was about 65 weight percent of the combustion products. The solids produced upon combustion were about 35 weight percent, the weight percents taken with regard to the total weight of the combustion products. In this composition, the mols of nitrogen were 6, the mols of carbon dioxide were 100, and the mols of water were 53. The gas molecular weight in grams per mol was 36.

Example 22—Pyrofoam Propellant Properties (PUR-KP:13)

A pyrotechnic or propellant foam was substantially prepared as described in Examples 15 and 16. However, in this example, the weight ratio of polyurethane to potassium perchlorate was 1:3. The oxygen balance was −12.5. Upon combustion in an inflator exemplified in FIGS. 3C-3E, the gas yield was 3.16 mol/100 g. The gas conversion was about 60 weight percent of the combustion products. The solids produced upon combustion were about 40 weight percent, the weight percents taken with regard to the total weight of the combustion products. In this composition, the mols of nitrogen were 4, the mols of carbon dioxide were 80, and the mols of water were 41. The gas molecular weight in grams per mol was 34.6.

Example 23—Pyrofoam Propellant Properties (PUR-KP:14)

A pyrotechnic or propellant foam was substantially prepared as described in Examples 15 and 16. However, in this example, the weight ratio of polyurethane to potassium perchlorate was 1:4. The oxygen balance was −0.8. Upon combustion in an inflator exemplified in FIGS. 3C-3E, the gas yield was 2.81 mol/100 g. The gas conversion was about 57 weight percent of the combustion products. The solids produced upon combustion were about 43 weight percent, the weight percents taken with regard to the total weight of the combustion products. In this composition, the mols of nitrogen were 4, the mols of carbon dioxide were 63, and the mols of water were 33. The gas molecular weight in grams per mol was 34.8.

Each of the examples in Examples 20-23 exhibited the following: a heat of reaction of about 2500 calories per gram; a PEP combustion temperature of 2900 C; a softening point greater than 275 C; an impact sensitivity greater than 15 inches; a friction sensitivity greater than 360N; and, a burning rate at 1-10 psi greater than 0.25 inches per second. Accordingly, the burn rate of these compositions indicated a very robust burn even at relatively low pressures.

Example 24

A first gas generating composition was made according to U.S. Pat. No. 5,035,757, the teachings of which are herein incorporated by reference. A second gas generating composition was made according to U.S. Pat. No. 8,273,199, the teachings of which are herein incorporated by reference. A third gas generating composition was made according to U.S. patent application Ser. No. 11/789,756, the teachings of which are herein incorporated by reference. A pyrotechnic foam (PF) was made as described in Example 16. The respective heats of combustion (calories/gram) for each of these compositions was as follows: first composition—775;

second composition—1200; third composition—888; and the heat of combustion for the pyrotechnic foam was 2500. The need to provide a more robust inflator able to accommodate higher operating/combustion pressures is reduced as the heat of combustion increases, thereby facilitating a more robust burn rate even at lower operating pressures. See for example, Examples 20-23.

Example 25—Hygroscopicity

A compound as prepared in Example 13, polyurethane, was found to have a greater propensity to adsorb moisture, or a relatively greater hygroscopicity wherein the following moisture gains at the humidity indicated (at 23 C) were recorded:
(1) 30% relative humidity for twenty-four hours resulted in 0.06609 weight percent gain with regard to the pre-humidification of the sample;
(2) 40% relative humidity for twenty-four hours resulted in 0.259 weight percent gain with regard to the pre-humidification of the sample;
(3) 50% relative humidity for twenty-four hours resulted in 0.6344 weight percent gain with regard to the pre-humidification of the sample;
(4) 60% relative humidity for twenty-four hours resulted in 0.811 weight percent gain with regard to the pre-humidification of the sample;
(5) 70% relative humidity for twenty-four hours resulted in 1.2425 weight percent gain with regard to the pre-humidification of the sample;
(6) 80% relative humidity for twenty-four hours resulted in 1.7765 weight percent gain with regard to the pre-humidification of the sample; and
(7) 90% relative humidity for twenty-four hours resulted in 2.5273 weight percent gain with regard to the pre-humidification of the sample.

Example 26—Hygroscopicity

A pyrotechnic or propellant foam as prepared in Example 14, was found to have a relatively greater resistance to adsorb moisture, or a relatively lesser hygroscopicity, wherein the following relatively lower moisture gains at the humidity indicated (at 23 C) were recorded:
(1) 30% relative humidity for twenty-four hours resulted in 0.032 weight percent with regard to the pre-humidification of the sample;
(2) 40% relative humidity for twenty-four hours resulted in 0.08008 weight percent with regard to the pre-humidification of the sample;
(3) 50% relative humidity for twenty-four hours resulted in 0.1921 weight percent with regard to the pre-humidification of the sample;
(4) 60% relative humidity for twenty-four hours resulted in 0.2082 weight percent with regard to the pre-humidification of the sample;
(5) 70% relative humidity for twenty-four hours resulted in 0.3111 weight percent with regard to the pre-humidification of the sample;
(6) 80% relative humidity for twenty-four hours resulted in 0.4299 weight percent with regard to the pre-humidification of the sample; and
(7) 90% relative humidity for twenty-four hours resulted in 0.6315 weight percent with regard to the pre-humidification of the sample.

Example 27—Hygroscopicity

A pyrotechnic or propellant foam as prepared in Examples 15 or 16, but with the potassium perchlorate being provided at about twice the weight of the polyurethane (2:1 weight ratio of potassium perchlorate to polyurethane), was found to have a relatively greater resistance to adsorb moisture, or a relatively lesser hygroscopicity, wherein the following relatively lower moisture gains at the humidity indicated (at 23 C) were recorded:
(1) 30% relative humidity for twenty-four hours resulted in 0.06506 weight percent with regard to the pre-humidification of the sample;
(2) 40% relative humidity for twenty-four hours resulted in 0.121 weight percent with regard to the pre-humidification of the sample;
(3) 50% relative humidity for twenty-four hours resulted in 0.2405 weight percent with regard to the pre-humidification of the sample;
(4) 60% relative humidity for twenty-four hours resulted in 0.2933 weight percent with regard to the pre-humidification of the sample;
(5) 70% relative humidity for twenty-four hours resulted in 0.4251 weight percent with regard to the pre-humidification of the sample;
(6) 80% relative humidity for twenty-four hours resulted in 0.5643 weight percent with regard to the pre-humidification of the sample; and
(7) 90% relative humidity for twenty-four hours resulted in 0.7928 weight percent with regard to the pre-humidification of the sample.

Example 28 (PUR-1) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Potassium nitrate, at about 7.7 grams, was mixed into the uncured polyol/di-isocyanate mixture (polyurethane) prior to curing, wherein the polyurethane to potassium nitrate mixture was about 3:1 by weight ratio. Based on scanning electron microscope (SEMS) analysis, the resultant foam was flexible, and exhibited an open cell structure that the oxidizer occupied. The micropores were well-interconnected, thereby facilitating excellent thermal conductivity and burn rate propagation. The composition was well-suited for cushion application.

Example 29 (PUR-2) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Potassium nitrate, at about 15.4 grams, was mixed into the uncured polyol/di-isocyanate mixture (polyurethane) prior to curing, wherein the polyurethane to potassium nitrate mixture was about 1.5:1 by weight ratio. Based on scanning electron microscope (SEMS) analysis, the resultant foam was flexible, and exhibited an open cell structure that the oxidizer occupied. The micropores were well-interconnected, thereby facilitating excellent thermal conductivity and burn rate propagation. The composition was well-suited for cushion application.

Example 30 (PUR-3) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Potassium nitrate, at about 23.1 grams, was mixed into the uncured polyol/di-isocyanate mixture (polyurethane) prior to curing, wherein the polyurethane to potassium nitrate mixture was about 1:1 by weight ratio. Based on scanning electron microscope (SEMS) analysis, the resultant foam was flexible, and exhibited an open cell structure that the oxidizer occupied. The micropores were well-interconnected, thereby facilitating excellent thermal conductivity and burn rate propagation. The composition was well-suited for cushion application.

Example 31 (PUR-4) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Potassium nitrate, at about 46 grams, was mixed into the uncured polyol/di-isocyanate mixture (polyurethane) prior to curing, wherein the polyurethane to potassium nitrate mixture was about 1:2 by weight ratio. Based on scanning electron microscope (SEMS) analysis, the resultant foam exhibited an open cell structure that the oxidizer occupied. The micropores were well-interconnected, thereby facilitating excellent thermal conductivity and burn rate propagation. The composition was still suited for cushion application. Even so, as the oxidizer amount increases, the cushioning effect decreases.

Example 32 (PUR-5) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Potassium perchlorate, at about 23.1 grams, was mixed into the uncured polyol/di-isocyanate mixture (polyurethane) prior to curing, wherein the polyurethane to potassium perchlorate mixture was about 1:1 by weight ratio. Based on scanning electron microscope (SEMS) analysis, the resultant foam was flexible, and exhibited an open cell structure. The micropores were well-interconnected, thereby facilitating excellent thermal conductivity and burn rate propagation. The composition was well-suited for cushion application.

Example 33 (PUR-6) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Basic copper nitrate, at about 23.1 grams, was mixed into the uncured polyol/di-isocyanate mixture (polyurethane) prior to curing, wherein the polyurethane to basic copper nitrate mixture was about 1:1 by weight ratio. Based on scanning electron microscope (SEMS) analysis, the resultant foam was stiff, with an open cell structure and well interconnected micropores. However, a uniform mixture was not obtained. The composition was not suited for cushion application. The composition functioned as a main gas generant and presented a relatively cool-burning foam.

Example 34 (PUR-7) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Basic copper nitrate, at about 7.7 grams, was mixed into the uncured polyol/di-isocyanate mixture (polyurethane) prior to curing, wherein the polyurethane to basic copper nitrate mixture was about 3:1 by weight ratio. Based on scanning electron microscope (SEMS) analysis, the resultant foam was flexible, with an open cell structure and well interconnected micropores. The composition was suited for cushion application.

Example 35 (PUR-8) Pyrotechnic/Propellant Foam Synthesis

A pyrotechnic or propellant foam was prepared as in Example 1, wherein the polyol was provided at 15.4 grams, twice the amount of di-isocyanate provided at 7.7 grams. Basic copper nitrate, at about 23.1 grams, was mixed into the uncured polyol/di-isocyanate mixture (polyurethane) prior to curing, wherein the polyurethane to basic copper nitrate mixture was about 1:1 by weight ratio. Based on scanning electron microscope (SEMS) analysis, the resultant foam was flexible, with an open cell structure and well interconnected micropores. The composition burned slowly but sustained the combustion. The composition was suited for cushion application.

Example 36 (PUR-9) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate, at about 21 grams, was mixed into the uncured polyol/di-isocyanate mixture (polyurethane) prior to curing, wherein the polyurethane to potassium perchlorate mixture was about 1:2 by weight ratio. Based on scanning electron microscope (SEMS) analysis, the resultant foam was flexible, with an open cell structure and well interconnected micropores. The composition was suited for cushion application, ignited well, sustained combustion, and may function as a main gas generant.

Example 37 (PUR-10) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate, at about 31.5 grams, was mixed into the uncured polyol/di-isocyanate mixture (polyurethane) prior to curing, wherein the polyurethane to potassium perchlorate mixture was about 1:3 by weight ratio. Based on scanning electron microscope (SEMS) analysis, the resultant foam was less flexible, with an open cell structure and well interconnected micropores. The composition was not suited for cushion application, but ignited well, sustained combustion, burns relatively very fast, and may function as a main gas generant.

Example 38 (PUR-11) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate, at about 42 grams, was mixed into the uncured polyol/di-isocyanate mixture (polyurethane)

prior to curing, wherein the polyurethane to potassium perchlorate mixture was about 1:4 by weight ratio. Based on scanning electron microscope (SEMS) analysis, the resultant foam was hard and stiff, with an open cell structure and well interconnected micropores. The composition was not suited for cushion application, but ignited well, sustained combustion, burns relatively very fast, and may function as a main gas generant.

Example 39 (PUR-12) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate at about 21 grams, and, copper oxide at about 10 grams were mixed into the uncured polyol/di-isocyanate mixture (polyurethane) prior to curing, wherein the polyurethane to potassium perchlorate to copper oxide mixture was about 1:2:1 by weight ratio. Based on scanning electron microscope (SEMS) analysis, the resultant foam was less flexible, with an open cell structure and well interconnected micropores. The composition was suited for cushion application, and ignited well and sustained combustion. The composition was black in color.

Example 40 (PUR-13) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate at about 10 grams, and, copper oxide at about 21 grams were mixed into the uncured polyol/di-isocyanate mixture (polyurethane) prior to curing, wherein the polyurethane to potassium perchlorate to copper oxide mixture was about 1:1.5:1.5 by weight ratio. Based on scanning electron microscope (SEMS) analysis, the resultant foam was flexible, with an open cell structure and well interconnected micropores. The composition was suited for cushion application, and ignited well and sustained combustion. The composition was black in color.

Example 41 (PUR-14) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate at about 15 grams, and, basic copper nitrate at about 15 grams were mixed into the uncured polyol/di-isocyanate mixture (polyurethane) prior to curing, wherein the polyurethane to potassium perchlorate to basic copper nitrate mixture was about 1:1.5:1.5 by weight ratio. Based on scanning electron microscope (SEMS) analysis, the resultant foam was hard, with an open cell structure and well interconnected micropores. The composition was not well-suited for cushion application, but sustained combustion. The composition was blue in color.

Example 42 (PUR-15) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate at about 15 grams, molecular sieve (13x) at about 7.5 grams, and, copper oxide at about 7.5 grams were mixed into the uncured polyol/di-isocyanate mixture (polyurethane) prior to curing, wherein the polyurethane to potassium perchlorate to molecular sieve to copper oxide mixture was about 1.5:2:1:1 by weight ratio. Based on scanning electron microscope (SEMS) analysis, the resultant foam was hard, with an open cell structure and well interconnected micropores. The composition was not well-suited for cushion application, but sustained combustion. The composition was blue in color.

Example 43 (PUR-16) Pyrotechnic/Propellant Foam Synthesis

A pyrotechnic or propellant foam was prepared as in Example 1, wherein the polyol was provided at 7 grams, twice the amount of di-isocyanate provided at 3.5 grams. Potassium perchlorate at about 10.5 grams, and molecular sieve (13x) at about 10.5 grams were mixed into the uncured polyol/di-isocyanate mixture (polyurethane) prior to curing, wherein the polyurethane to potassium perchlorate to molecular sieve mixture was about 1:1:1 by weight ratio. Based on scanning electron microscope (SEMS) analysis, the resultant foam was hard, with an open cell structure and well interconnected micropores. The composition was not well-suited for cushion application, and did not sustain combustion.

Example 44 (PUR-47) Pyrotechnic/Propellant Foam Synthesis

A pyrotechnic or propellant foam was prepared as in Example 1, wherein the polyol was provided at 8 grams, twice the amount of di-isocyanate provided at 4 grams. Sodium nitrate at about 24 grams was mixed into the uncured polyol/di-isocyanate mixture (polyurethane) prior to curing, wherein the polyurethane to sodium nitrate was about 1:2 by weight ratio. The composition functions as a slow-burning propellant.

Example 45 (PUR-48) Pyrotechnic/Propellant Foam Synthesis

A pyrotechnic or propellant foam was prepared as in Example 1, wherein the polyol was provided at 8 grams, twice the amount of di-isocyanate provided at 4 grams. Strontium nitrate at about 24 grams was mixed into the uncured polyol/di-isocyanate mixture (polyurethane) prior to curing, wherein the polyurethane to strontium nitrate was about 1:2 by weight ratio. The composition functions as a slow-burning propellant.

Example 46 (PUR-50) Pyrotechnic/Propellant Foam Synthesis

A pyrotechnic or propellant foam was prepared as in Example 1, wherein the polyol was provided at 8 grams, twice the amount of di-isocyanate provided at 4 grams. Ammonium polyvinyl-tetrazole (A-PVT) at about 6 grams was mixed into the uncured polyol/di-isocyanate mixture (polyurethane) prior to curing, wherein the polyurethane to A-PVT was about 2:1 by weight ratio. The composition functions as a slow-burning fuel.

Example 47 (PUR-51)

A pyrotechnic or propellant grain was prepared as in Example 1, wherein the polyol was provided at 8 grams, twice the amount of di-isocyanate provided at 4 grams. Ammonium polyvinyl-tetrazole (A-PVT) at about 12 grams was mixed into the uncured polyol/di-isocyanate mixture (polyurethane) prior to curing, wherein the polyurethane to A-PVT was about 1:1 by weight ratio. The composition formed as a grain and functions as a slow-burning fuel.

Example 48 (PUR-52)

A pyrotechnic or propellant foam was prepared as in Example 1, wherein the polyol was provided at 8 grams, twice the amount of di-isocyanate provided at 4 grams. Iron (III) oxide at about 12 grams was mixed into the uncured polyol/di-isocyanate mixture (polyurethane) prior to curing. The composition functions as a slow-burning propellant.

Example 49 (PUR-53)

A pyrotechnic or propellant foam was prepared as in Example 1, wherein the polyol was provided at 8 grams, twice the amount of di-isocyanate provided at 4 grams. Potassium perchlorate at about 12 grams and Bis-1H-tetrazole (acidic) at about 12 grams were mixed into the uncured polyol/di-isocyanate mixture (polyurethane) prior to curing. The composition functions as a fast-burning propellant.

Example 50 (PUR-54)

A pyrotechnic or propellant grain was prepared as in Example 1, wherein the polyol was provided at 6 grams, twice the amount of di-isocyanate provided at 3 grams. Potassium perchlorate at about 12 grams and Bis-1H-tetrazole (acidic) at about 12 grams were mixed into the uncured polyol/di-isocyanate mixture (polyurethane) prior to curing. The composition formed as a grain and functions as a fast-burning propellant and if desired, a main gas generating composition.

Example 51 (PUR-60)

A pyrotechnic or propellant foam was prepared as in Example 1, wherein the polyol was provided at 4 grams, twice the amount of di-isocyanate provided at 2 grams. Potassium perchlorate at about 12 grams and titanium hydride at about 6 grams were mixed into the uncured polyol/di-isocyanate mixture (polyurethane) prior to curing. The composition functions as a fast-burning sparkle propellant (or gas generating composition) and booster.

Example 52 (PUR-17(AB-11)))

A pyrotechnic or propellant foam was prepared as in Example 1, wherein the polyol was provided at 7.5 grams, twice the amount of di-isocyanate provided at 7.5 grams. An auto-ignition and booster composition as formed in U.S. Pat. No. 8,273,199, at about 15 grams was mixed into the uncured polyol/di-isocyanate mixture (polyurethane) prior to curing. The cured composition was hard and stiff. Excess di-isocyanate is attributed to the stiffness of the composition. The composition is not suitable as a cushion.

Example 53 (PUR-18 (AB-12))

A pyrotechnic or propellant foam was prepared as in Example 1, wherein the polyol was provided at 7.5 grams, and the amount of di-isocyanate is provided at about 15 grams. An auto-ignition and booster composition as formed in U.S. Pat. No. 8,273,199, at about 15 grams was mixed into the uncured polyol/di-isocyanate mixture (polyurethane) prior to curing. The cured composition was hard and stiff wherein the top and bottom surfaces were much harder than the middle section of the foam. Excess di-isocyanate is attributed to the stiffness of the composition. The composition is not suitable as a cushion.

Example 54 (PUR-19 (AB-21))

A pyrotechnic or propellant foam was prepared as in Example 1, wherein the polyol was provided at about 15 grams, and the amount of di-isocyanate is provided at about 7.5 grams. An auto-ignition and booster composition as formed in U.S. Pat. No. 8,273,199, at about 15 grams was mixed into the uncured polyol/di-isocyanate mixture (polyurethane) prior to curing. The cure rate of the composition was accelerated, and a higher foam volume occurred with flexibility in the foam well-suited for cushion application. The component weight ratios of this composition are strongly preferred for foam formation.

Example 55 (PUR-20 (AB-31))

A pyrotechnic or propellant foam was prepared as in Example 1, wherein the polyol was provided at about 22.5 grams, and the amount of di-isocyanate is provided at about 7.5 grams. An auto-ignition and booster composition as formed in U.S. Pat. No. 8,273,199, at about 15 grams was mixed into the uncured polyol/di-isocyanate mixture (polyurethane) prior to curing. The composition remained sticky and did not cure. Unreacted and excess polyol make the foam sticky and not suited for cushion application.

Example 56 (PUR-21 (AB-13))

A pyrotechnic or propellant foam was prepared as in Example 1, wherein the polyol was provided at about 7.5 grams, and the amount of di-isocyanate is provided at about 22.5 grams. An auto-ignition and booster composition as formed in U.S. Pat. No. 8,273,199, at about 15 grams was mixed into the uncured polyol/di-isocyanate mixture (polyurethane) prior to curing. The composition cured to a hard and brittle consistency. The composition was unsuited for cushion application.

Example 57 Standard Ceramic Cushion

A primary pyrotechnic composition was prepared as described in U.S. patent application Ser. No. 13/637,552, the teachings of which are herein incorporated by reference. The primary composition contained the following substantially uniform mixture: ammonium nitrate at about 66.6 wt. % phase stabilized with about 10.0 wt. % potassium nitrate, ammonium di-nitro salicylic acid at about 13.9 wt. %, and di-ammonium salt of bis-1H-tetrazole at about 10.0 wt. %. This composition was coated with paraffin at about 0.2 wt. % of the total composition as mixed and described above.

An inflator or gas generator as described herein and shown in FIG. 3A (e.g. with a ceramic cushion 126) was loaded with 24 grams of the composition described herein. Upon actuation of the inflator, a maximum chamber pressure of about 32 MPa occurred, and a maximum tank pressure (one cubic foot volume) of about 190 kPa occurred.

Example 58

A primary pyrotechnic composition weighing 23.5 grams was prepared as described in Example 61. An auto-ignition and booster composition as formed in U.S. Pat. No. 8,273, 199, at about 1.5 grams was also provided. A pyrotechnic or propellant cushion was prepared as described in Example 36.

An inflator or gas generator as described herein and shown in FIG. 3B was loaded with a pyrotechnic or propellant foam cushion 142 was loaded with the compositions and cushion described above. Upon actuation of the inflator, a maximum chamber pressure of about 40 MPa occurred, and a maximum tank pressure (one cubic foot volume) of about 78 kPa occurred.

Example 59 PU/KP Cushion

A pyrotechnic or propellant cushion was prepared as described in Example 36. An inflator or gas generator as described herein and shown in FIG. 3B or 3C (e.g. with a pyrotechnic or propellant foam cushion 142/144 weighing 3.83 grams) was loaded with the cushion described above. Upon actuation of the inflator, a maximum chamber pressure of about 56 MPa occurred, and a maximum tank pressure (one cubic foot volume) of about 240 kPa occurred.

Example 60

A primary pyrotechnic composition weighing 23.0 grams was prepared as described in Example 61. An auto-ignition and booster composition as formed in U.S. Pat. No. 8,273, 199, at about 1.0 grams was also provided. A pyrotechnic or propellant cushion was prepared as described in Example 36.

An inflator or gas generator as described herein and shown in FIG. 3B or 3C (e.g. with a pyrotechnic or propellant foam cushion 142/144 weighing 2.5 grams was loaded with the compositions and cushion described above. Upon actuation of the inflator, a maximum chamber pressure of about 27.5 MPa occurred, and a maximum tank pressure (one cubic foot volume) of about 180 kPa occurred.

Example 61

A primary pyrotechnic composition weighing 23.0 grams was prepared as described in Example 61. An auto-ignition and booster composition as formed in U.S. Pat. No. 8,273, 199, at about 1.5 grams was also provided. A pyrotechnic or propellant cushion was prepared as described in Example 36. However, the cushion had 4 parts of potassium perchlorate per 1 part of polyurethane.

An inflator or gas generator as described herein and shown in FIG. 3B or 3C (e.g. with a pyrotechnic or propellant foam cushion 142/144 weighing 3.9 grams was loaded with the compositions and cushion described above. Upon actuation of the inflator, a maximum chamber pressure of about 47.5 MPa occurred, and a maximum tank pressure (one cubic foot volume) of about 220 kPa occurred.

Example 62 Booster Tube Pyrotechnic Cushion

A pyrotechnic or propellant cushion/booster tube was formed from polyurethane and potassium perchlorate at a 1:2 weight ratio, and was prepared as described in Example 36.

An inflator or gas generator as described herein and shown in FIG. 3E (e.g. with a pyrotechnic or propellant foam cushion 148 weighing 3.9 grams was loaded into the inflator as shown. This completely supplanted the need for a metal booster tube and booster composition therein. Upon actuation of the inflator, a maximum tank pressure (one cubic foot volume) of about 190 kPa occurred with a relatively high average output of about 180 kPa tank pressure over 0.225 seconds. A maximum chamber pressure (in the inflator) was measured at about 63 mPa.

It is further understood that the ballistic behavior of the booster tube may be modified by altering its shape, increasing its porosity by boring holes through the structure, and in general, increasing or altering the surface area to modify the burn rate.

With regard to the pyrotechnic or propellant foam (secondary gas generating composition) containing polyurethane and at least one oxidizer, the total weight percent of the polyol combined with di-isocyanate, that is the polyurethane, is 10-90 weight percent; with regard to the oxidizer component containing one or more oxidizers, the total weight percent of the oxidizer ingredients is 10-90 weight percent, again with the weight percents taken with regard to the total weight of the secondary gas generating composition.

The present description is for illustrative purposes only, and should not be construed to limit the breadth of the present invention in any way. Thus, those skilled in the art will appreciate that various modifications could be made to the presently disclosed embodiments without departing from the intended spirit and scope of the present invention. Other aspects, features and advantages will be apparent upon an examination of the attached drawing figures.

What is claimed is:

1. A gas generator containing:
   a housing having a first end and a second end, the housing defining a plurality of inflation apertures extending from an exterior of the housing to an interior of the housing;
   a combustion chamber disposed within the interior of the housing;
   a gas generating composition comprising a plurality of propellant grains, tablets, wafers, or a combination thereof, contained within the combustion chamber of the housing, ignitable upon activation of the gas generator;
   a propellant cushion comprising a polyurethane foam and oxidant; and
   a plenum in fluid communication with the combustion chamber and the plurality of inflation apertures such that gases generated upon ignition of the gas generating composition flow from the combustion chamber, through the plenum, and through the plurality of inflation apertures.

2. The gas generator of claim 1 wherein said gas generating composition is formed as a bed of desired shapes with interstitial cavities formed between said desired shapes, and, said propellant cushion is positioned amongst at least a portion of said interstitial cavities.

3. The gas generator of claim 1 wherein said propellant cushion is positioned as a cushion in physical contact with said gas generating composition and an adjacent structural member of the gas generator.

4. The gas generator of claim 2 wherein said propellant cushion is extruded as an uncured composition into at least a portion of said interstitial cavities, and then cured.

5. The gas generator of claim 1 wherein said propellant cushion further comprises a transition metal oxide.

6. The gas generator of claim 1 wherein said oxidizer is selected from metal nitrates, metal oxides, and metal and nonmetal chlorates and perchlorates.

7. The gas generator of claim 1 wherein the polyurethane foam is selected from aliphatic or aromatic di-isocyanate-based foams.

8. The gas generator of claim 1 wherein the polyurethane foam is selected from hexamethylene di-isocyanate-based foam, methylene diphenyl di-isocyanate-based foam, and mixtures thereof.

9. The gas generator of claim 1 wherein said propellant cushion is formed into a discoid cushion or in the shape of a booster tube.

10. A gas generator comprising:
a housing having a first end and a second end, the housing defining a plurality of inflation apertures extending from an exterior of the housing to an interior of the housing;
a propellant chamber disposed within the interior of said housing;
a first gas generating composition in shaped form wherein interstitial cavities are defined between the separate shaped forms of the first gas generating composition;
a second gas generating composition in said propellant chamber, said second gas generating composition injected into at least a portion of said interstitial cavities, wherein said second gas generating composition contains a polymeric fuel and an oxidizer; and
a plenum in fluid communication with the propellant chamber and the plurality of inflation apertures such that gases generated upon ignition of the first gas generating composition and second gas generating composition flow from the propellant chamber, through the plenum, and through the plurality of inflation apertures.

11. The gas generator of claim 10 wherein said second gas generating composition comprises polyurethane and a perchlorate-based oxidizer.

12. The gas generator of claim 10 wherein said second gas generating composition is cured within said interstitial cavities.

13. The gas generator of claim 10 wherein said first gas generating composition is wafer-formed, pelletized, tabletted, or asymmetric in shape.

14. A gas generator comprising:
a housing having a first end and a second end, the housing defining a plurality of inflation apertures extending from an exterior of the housing to an interior of the housing;
a propellant chamber disposed within the interior of said housing;
a gas generating composition formed in discrete shapes;
a plurality of interstitial cavities defined between said discrete shapes;
a cushioning material contained within at least a portion of said interstitial cavities; and
a plenum in fluid communication with the propellant chamber and the plurality of inflation apertures such that gases generated upon ignition of the gas generating composition flow from the propellant chamber, through the plenum, and through the plurality of inflation apertures.

15. The gas generator of claim 14 wherein said cushioning material is physically positioned within said at least a portion of said interstitial cavities.

16. The gas generator of claim 14 wherein said cushioning material is extruded within said at least portion of said interstitial cavities and then cured in place.

17. The gas generator of claim 14 wherein said cushioning material comprises a polyurethane and an oxidizer.

18. The gas generator of claim 17 wherein said oxidizer is selected from metal and nonmetal nitrates, chlorates, perchlorates, and mixtures thereof.

19. The gas generator of claim 1 wherein said propellant cushion further comprises an additive comprising an aliphatic or aromatic compound selected from carboxylic acids, five membered heterocycles, six membered heterocycles, and combinations thereof.

20. The gas generator of claim 19 wherein said propellant cushion further comprises bis-tetrazole or bis-tetrazole methane.

21. The gas generator of claim 1 wherein said propellant cushion further comprises an additive comprising an aliphatic or aromatic acid, amine, a nitrogen containing heterocycle, a metal hydride, a metal boride, a salt thereof, or a mixture thereof.

22. The gas generator of claim 21, wherein the nitrogen containing heterocycle comprises a triazole, a tetrazole, a triazine, a salt thereof, or a mixture thereof.

23. The gas generator of claim 1, further comprising at least one burst shim, the at least one burst shim removably sealing at least one of the plurality of inflation apertures.

* * * * *